(12) United States Patent
Hensley et al.

(10) Patent No.: US 8,870,506 B2
(45) Date of Patent: Oct. 28, 2014

(54) MOVEMENT-COMPENSATING PLATE ANCHOR

(71) Applicant: Emseal Joint Systems Ltd., Westborough, MA (US)

(72) Inventors: Lester Hensley, Westborough, MA (US); William Witherspoon, Guelph (CA)

(73) Assignee: Emseal Joint Systems, Ltd., Westborough, MA (US)

( * ) Notice: Subject to any disclaimer, the term of this patent is extended or adjusted under 35 U.S.C. 154(b) by 12 days.

(21) Appl. No.: 13/666,161

(22) Filed: Nov. 1, 2012

(65) Prior Publication Data

US 2013/0104483 A1 May 2, 2013

Related U.S. Application Data

(63) Continuation-in-part of application No. 12/730,527, filed on Mar. 24, 2010, now Pat. No. 8,317,444.

(60) Provisional application No. 61/162,839, filed on Mar. 24, 2009.

(51) Int. Cl.
| | |
|---|---|
| *F16B 35/04* | (2006.01) |
| *F16B 5/02* | (2006.01) |
| *E04B 1/98* | (2006.01) |
| *E04B 1/38* | (2006.01) |
| *E04B 1/68* | (2006.01) |
| *E01D 19/06* | (2006.01) |
| *F16B 33/00* | (2006.01) |
| *F16B 13/14* | (2006.01) |
| *E04H 9/02* | (2006.01) |

(52) U.S. Cl.
CPC ............... *E04B 1/985* (2013.01); *F16B 35/04* (2013.01); *F16B 5/0266* (2013.01); *E01D 19/06* (2013.01); *F16B 5/0241* (2013.01); *F16B 33/002* (2013.01); *E04B 1/6803* (2013.01); *F16B 13/141* (2013.01); *E04H 9/021* (2013.01); *E04B 1/38* (2013.01)
USPC .......................... 411/82; 411/544; 52/396.05

(58) Field of Classification Search
USPC ......... 411/82, 432, 544; 52/393, 395, 396.04, 52/396.05
See application file for complete search history.

(56) References Cited

U.S. PATENT DOCUMENTS

| | | | |
|---|---|---|---|
| 3,372,521 A | 3/1968 | Thom | |
| 3,670,470 A | 6/1972 | Thom | |
| 3,677,145 A | 7/1972 | Wattiez | |
| 4,725,176 A * | 2/1988 | Connolly et al. | 411/427 |
| 4,840,524 A * | 6/1989 | Bisping et al. | 411/82 |
| 5,094,057 A | 3/1992 | Morris | |
| 5,572,920 A | 11/1996 | Kennedy et al. | |
| 6,014,848 A | 1/2000 | Hilburn | |

(Continued)

*Primary Examiner* — Flemming Saether
(74) *Attorney, Agent, or Firm* — MKG, LLC

(57) ABSTRACT

A system configured to anchor a cover plate over an interface formed between substantially coplanar substrates includes a sleeve capable of being anchored in a first substrate; a spring located in the sleeve; a post located in communication with the spring; and a fastener secured onto the post. A head of the post is located in the sleeve, and an end of the post opposite the head of the post extends out of the sleeve to receive the fastener. The fastener is secured onto the post over the cover plate located on the first substrate such that the cover plate extends over the interface formed between the first and second substrates when they are positioned to be substantially coplanar.

16 Claims, 7 Drawing Sheets

(56) References Cited

U.S. PATENT DOCUMENTS

| | | | |
|---|---|---|---|
| 6,139,113 A * | 10/2000 | Seliga | 301/35.624 |
| 6,439,816 B1 * | 8/2002 | Nance et al. | 411/108 |
| 6,499,265 B2 | 12/2002 | Shreiner | |
| 7,114,899 B2 | 10/2006 | Gass et al. | |
| 7,748,310 B2 | 7/2010 | Kennedy | |
| 8,317,444 B1 * | 11/2012 | Hensley | 411/107 |
| 2007/0170346 A1 * | 7/2007 | Vappula | 249/139 |
| 2008/0087058 A1 * | 4/2008 | Chang | 70/233 |

* cited by examiner

MOVEMENT-COMPENSATING PLATE ANCHOR

CROSS REFERENCE TO RELATED APPLICATIONS

This Application is a Continuation-in-Part Application of U.S. patent application Ser. No. 12/730,527 filed on Mar. 24, 2010, now U.S. Pat. No. 8,317,444, which claims the benefit of U.S. Provisional Patent Application No. 61/162,839, filed on Mar. 24, 2009, the contents of each of which are incorporated herein by reference in their entirety.

TECHNICAL FIELD

The present invention is generally directed to joint systems, and more particularly, to cover plates for use with expansion and seismic joint systems in building and construction applications.

BACKGROUND

Building and construction applications in which materials such as concrete, metal, and glass are used typically employ joint systems that accommodate movement due to thermal expansion and/or seismic effects. These joint systems may be positioned to extend through both the interior and exterior surfaces (e.g., walls, floors, and roofs) of a building or other structure. In the case of an exterior joint in a wall, roof, or floor exposed to external environmental conditions, the joint system may also, to some degree, resist the effects of such conditions. Particularly with regard to horizontally-oriented joints in parking garages and the like, the joints are designed to resist rain, standing water, snow, ice, debris such as sand, and in some circumstances several of these at the same time as well as the effects of traffic. Horizontally-oriented joints subjected to pedestrian and/or vehicular traffic and designed to withstand such traffic generally incorporate cover plates that are positioned over the joints to protect the materials of the joint system against the environmental conditions and to allow for smooth traffic flow. Such cover plates may also be positioned over spaces, holes, or structural gaps where there is no material to be protected but to allow for smooth traffic flow. The cover plates are typically steel or material of similar durability.

In anchoring the cover plates across joints or structural gaps in concrete or other structural surfaces which may experience movement such as thermal expansion and/or seismic effects, the cover plate is attached on one side of the joint or structural gap so as to allow the structural elements beneath the plate to expand and contract and otherwise move as a consequence of the thermal and seismic forces as well as dynamic load transfer. Cover plates are also utilized in applications involving the securing of any other element that incorporates a mounting plate (such as a sign) to a substrate where wind or other forces will cause a load on the mounting plate or in the fasteners securing the mounting plate. In such applications, stresses are induced in the anchoring fasteners. These stresses can cause conventional fasteners to fail in various ways. For example, fasteners can loosen, pull out of the substrate, or damage the substrate. Stresses can also cause deformation of a cover plate as a consequence of being too firmly restrained by the fasteners.

SUMMARY

In one aspect, the present invention resides in a system configured to anchor a cover plate over an interface formed between substantially coplanar substrates. The system comprises a sleeve anchorable in a first substrate; a spring located in the sleeve; a post located in communication with the spring; and a fastener secured onto the post. A head of the post is located in the sleeve, and an end of the post opposite the head of the post extends out of the sleeve to receive the fastener. The fastener is secured onto the post over the cover plate located on the first substrate such that the cover plate extends over the interface formed between the first and second substrates when they are positioned to be substantially coplanar.

In another aspect, the present invention resides in a system configured to cover a gap or joint between two substantially coplanar substrates. The system comprises a cover plate locatable over a gap between first and second substrates that are arranged to be substantially coplanar and an anchoring system configured to anchor the cover plate to the first substrate. The anchoring system configured to anchor the cover plate comprises a sleeve located in the first substrate; a spring located in the sleeve; a post located in communication with the spring; and a fastener secured onto the post extending through the cover plate. A head of the post is located in the sleeve. Upon tightening the fastener onto the post, the cover plate is secured in place over the gap, and the substrates are able to move relative to each other in substantially coplanar directions.

In another aspect, the present invention resides in an anchor configured to anchor a cover plate over a gap or joint formed between coplanar substrates. The anchor comprises a sleeve located in a first substrate; a spring located in the sleeve; a post axially extending through the spring; and a fastener secured onto a portion of the post extending out of the spring. The cover plate can be located over the gap formed between the first substrate and a second substrate that define the coplanar substrates such that the post extending out of the sleeve is received through a hole in the cover plate. Upon tightening the fastener onto the post, the cover plate is secured to the first substrate and over the gap. The substrates are then able to move relative to each other in substantially coplanar directions. Clearances between the spring, the post, and the sleeve also allow for movement of the first substrate and the second substrate in non-coplanar directions.

In a further aspect, the present invention resides in a system configured to anchor a cover plate over an interface formed between a first substrate and a second substrate which are substantially coplanar with each other. The system comprises a sleeve comprising a center channel and anchorable in the first substrate, wherein the sleeve has a first end and a second end. The system further comprises a collar comprising a pin, wherein the center channel of the sleeve receives the collar at the pin; a spring located in the sleeve and positioned on the collar; and a post located in communication with the spring. The post is configured to screw down into the collar through the spring to effect a tightening of the system. The lower end of the post is received in the sleeve and an upper end of the post comprises a hemispherical head extending out of the sleeve and configured to be received in an opening in the cover plate. The system also comprises a first end stop configured to attach to the first end of sleeve; and a second end stop configured to attach to the second end of the sleeve. The second end stop comprises a center channel which receives the post.

In another aspect, the present invention resides in a covering system configured to cover a gap between a first substrate and a second substrate which are substantially coplanar with each other. The covering system comprises a cover plate locatable over the gap defined between the first substrate and the second substrate substantially coplanar with the first substrate; and an anchoring system configured to anchor the cover plate over the gap. The anchoring system comprises a sleeve comprising a center channel and anchorable in the first substrate, wherein the sleeve has a first end and a second end; a collar comprising a pin, wherein the center channel of the sleeve receives the collar at the pin; and a spring located in the sleeve and positioned on the collar. A post is located in communication with the spring, the post configured to screw down into the collar through the spring to effect a tightening of the anchoring system. A lower end of the post is received in the sleeve and an upper end of the post comprises a hemispherical head extending out of the sleeve and configured to be received through an opening in the cover plate. The anchoring system further comprises a first end stop configured to attach to the first end of sleeve; and a second end stop configured to attach to the second end of the sleeve. The second end stop comprises a center channel which receives the post such that the hemispherical head of the post is configured to rest on a portion of the cover plate.

In a further aspect, the present invention resides in an anchor configured to anchor a cover plate over a gap formed between a first substrate and a second substrate which are substantially coplanar with each other. The anchor comprises a sleeve comprising a center channel and anchorable in the first substrate, wherein the sleeve has a first end and a second end. The anchor also comprises a collar comprising a pin, wherein the center channel of the sleeve receives the collar at the pin; a spring located in the sleeve and positioned on the collar; and a post located in communication with the spring. The post is configured to screw down into the collar through the spring to effect a tightening of the anchoring system, wherein a lower end of the post is received in the sleeve and an upper end of the post comprises a hemispherical head extending out of the sleeve and configured to be received through an opening in the cover plate. The system further comprises a first end stop configured to attach to the first end of sleeve; and a second end stop configured to attach to the second end of the sleeve, the second end stop comprising a center channel which receives the post.

In another aspect, the present resides in a method of anchoring a cover plate over a gap formed between a first substrate and a second substrate which are substantially coplanar with each other. The method comprises locating the cover plate over the gap defined between the first substrate and the second substrate substantially coplanar with the first substrate; and providing an anchoring system in the first substrate to anchor the cover plate over the gap. The anchoring system comprises a sleeve comprising a center channel, the sleeve being anchored in the first substrate, wherein the sleeve has a first end and a second end. The anchoring system also comprises a collar comprising a pin, wherein the center channel of the sleeve receives the collar at the pin; and a spring located in the sleeve and positioned on the collar. A post is located in communication with the spring. A lower end of the post is received in the sleeve and an upper end of the post comprises a hemispherical head extending out of the sleeve and received in an opening in the cover plate. The system further comprises a first end stop attached to the first end of the sleeve; and a second end stop attached to the second end of the sleeve. The second end stop comprises a center channel which receives the post such that the hemispherical head of the post rests on a portion of the cover plate. The method also comprises tightening the post to screw the post down into the collar through a portion of the cover plate and through the spring to effect a tightening of the anchoring system.

DETAILED DESCRIPTION

Figure 1:
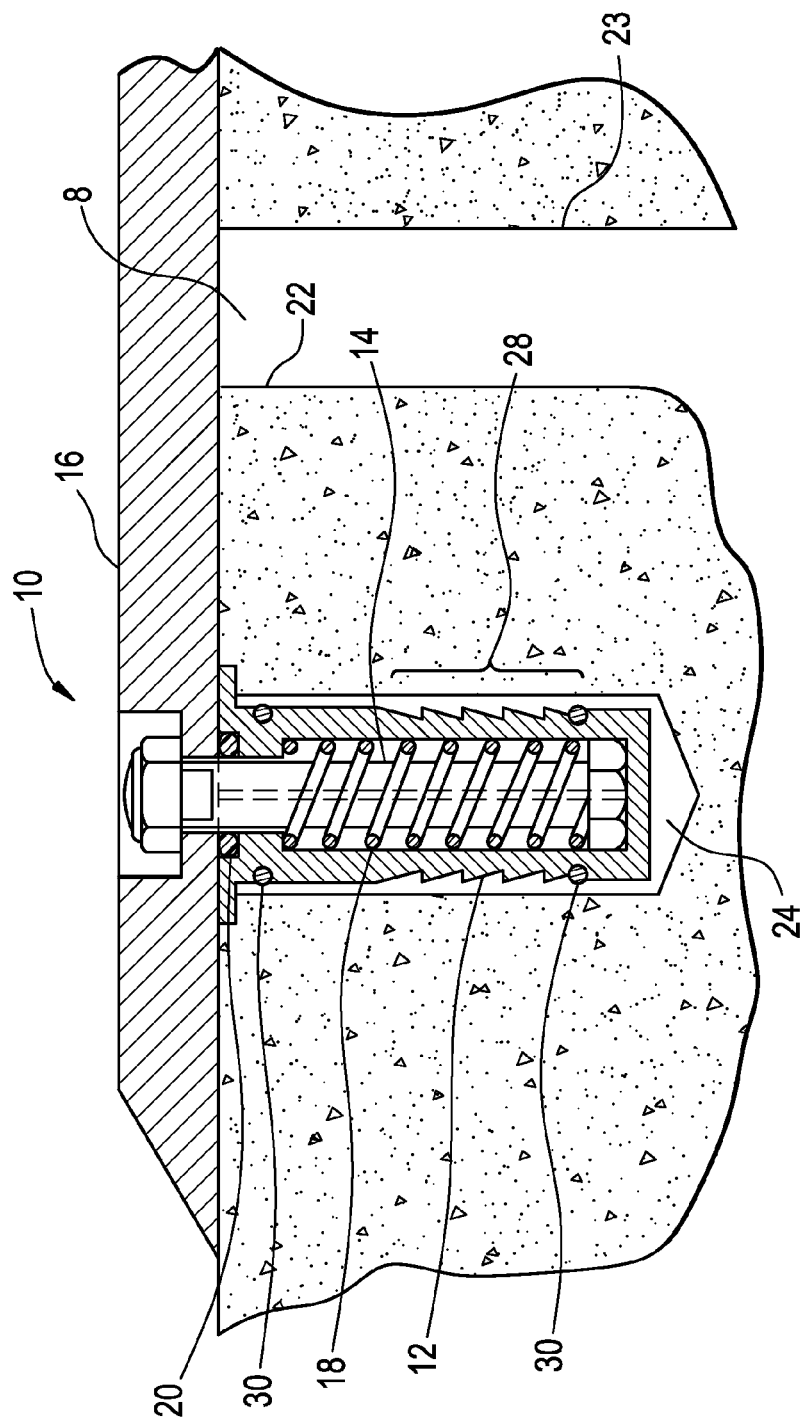
FIG. 1 is a side sectional view of a system configured to anchor plates over an expansion joint or gap, according to an embodiment.

As is shown in FIG. 1, a system configured to anchor plates over an interface 8 (hereinafter referred to as an expansion joint, a joint, or a gap) formed between two coplanar substrates forming a structure and compensating for structural movement of the substrates is shown generally at 10 and is hereinafter referred to as "system 10." The two substantially coplanar substrates may be the floor of a parking garage or other structure. However, the present invention is not limited in this regard as the two coplanar substrates may define any structure. Furthermore, although the embodiments described herein refer to horizontal surfaces, the present invention is also applicable to vertical surfaces and so forth.

System 10 comprises a sleeve 12 in which a post 14, including but not limited to, a bolt 14 and a spring 18 is retained such that the bolt 14 extends through the spring 18 and one end of the bolt 14 extends from one end of the sleeve 12. The sleeve 12 may be anchored to the walls defining a hole in a horizontally oriented surface of the structure such as a concrete substrate 22. The end of the bolt 14 extending from the sleeve 12 extends through a cover plate (hereinafter "plate 16") which is positioned proximate the edge of the concrete substrate 22 and across a joint or gap (e.g., interface 8) formed between the concrete substrate 22 and a second concrete substrate 23. An O-ring 20 or similar device is located at the interface of the plate 16 and the surface of the concrete substrate 22 to limit or inhibit the passage of moisture and/or debris from the surface of the concrete substrate 22 and/or the plate 16 to the bolt 14 and spring 18.

The hole in the concrete substrate 22 in which the sleeve 12 is anchored may be drilled or otherwise formed therein subsequent to forming the concrete substrate 22 and prior to constructing the structure. In the alternative, the hole can be formed during forming of the concrete substrate 22. The present invention is not limited to the use of the system 10 in structures employing concrete substrates 22 and 23, however, as the substrates may be formed using other materials.

The sleeve 12 may be anchored to the walls of the hole in the concrete substrate 22 with use of a suitable anchoring mechanism, such as a sealing mechanism using, e.g., an adhesive 24. The adhesive 24 may be cementitious grout, elastomeric resin, epoxy, or any other material that facilitates the anchoring of the sleeve 12 into the concrete substrate 22, thereby locking the system 10 in place. As noted above, the present invention is not limited to the use of the adhesive 24 to anchor the sleeve 12 to the walls of the hole, however, as the sleeve 12 may also be configured such that an interference fit can be achieved by driving the sleeve 12 into the hole, thereby frictionally retaining the system 10 in the concrete substrate 22. Irrespective of the configuration used, at least a portion of the outer surface of the sleeve 12 includes ridges 28 that can facilitate the anchoring of the sleeve 12 in the concrete substrate 22, according to an embodiment.

In an embodiment, the sleeve 12 is machined or swaged or otherwise manufactured as one part. The sleeve 12 is not limited to being manufactured as one part, however, as the sleeve may comprise two or more parts that can be assembled to receive and encapsulate the bolt 14 and the spring 18. When the sleeve 12 is constructed from multiple parts, the parts can be held together (thereby retaining the bolt 14 and the spring 18 therein) using bands 30, cable, or wire positioned and tightened around an outer surface 34 of the sleeve 12, a clip such as a spring clip, or any other suitable retaining mechanism.

Figure 2:
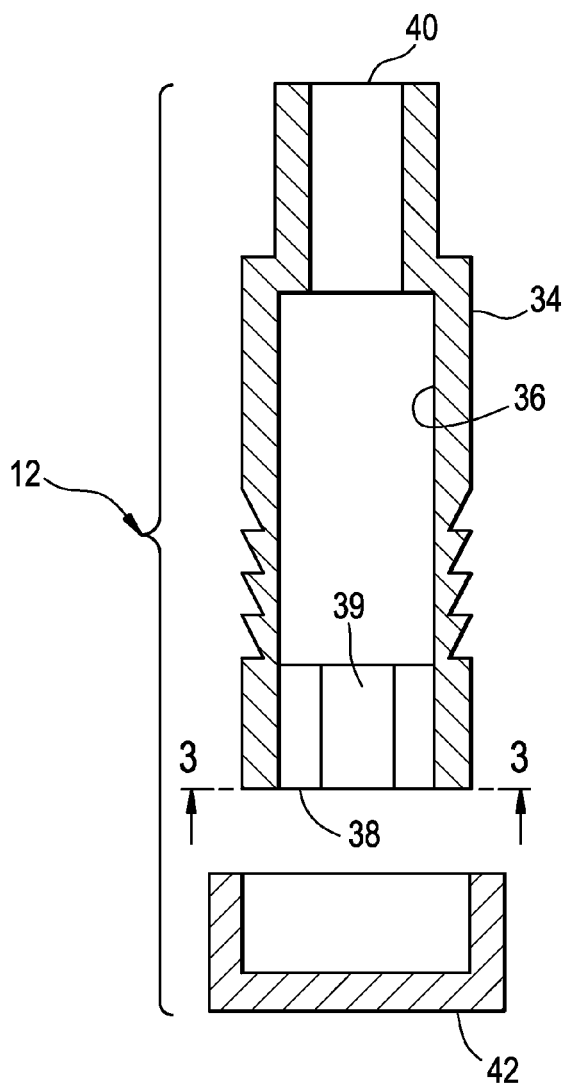
FIG. 2 is a side sectional view of a sleeve of the system of FIG. 1.

As is shown in FIG. 2, the sleeve 12 is substantially cylindrical in shape and is defined by the outer surface 34 and an inner surface 36. The sleeve 12 has a lower end 38 located within the concrete substrate 22 and an upper end 40 located at the surface of the concrete substrate 22. Furthermore, the lower end 38 of the sleeve 12 can be closed or capped by a cap 42 or the like frictionally fitted on the lower end 38. The present invention is not limited in this regard, however, as the outer surface of the lower end 38 of the sleeve 12 may be configured to threadedly receive the cap 42. In an alternative embodiment, the lower end 38 of the sleeve 12 may be closed during the manufacturing and/or assembly of the sleeve 12 by the parts of the sleeve 12 themselves.

Figure 3:
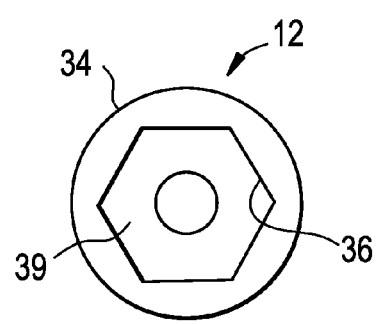
FIG. 3 is an end view of the sleeve of FIG. 2.

As is shown in FIGS. 2 and 3, at least a portion 39 of the inner surface 36 of the sleeve 12 is hexagonal in cross-sectional geometry to accommodate the head of the bolt 14. The outer surface 34 may be round or any other desired shape (e.g., square) suited for being retained on the walls of the hole in the concrete substrate 22.

Figure 4:
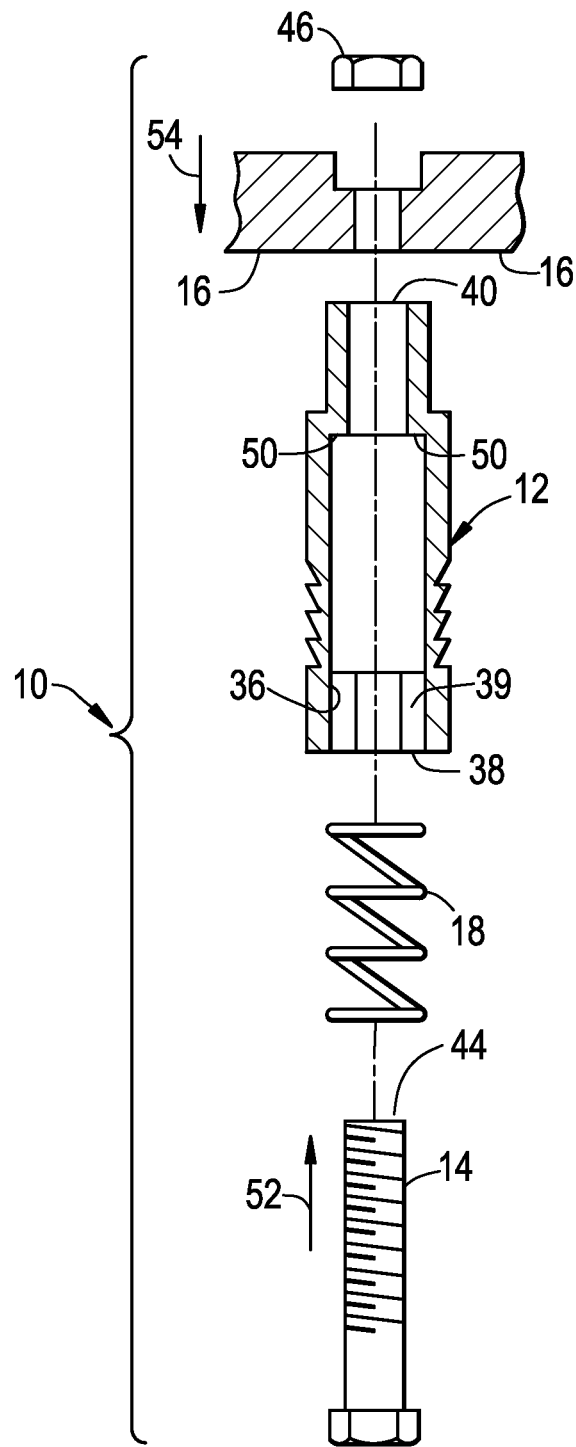
FIG. 4 is an exploded side sectional view of the system of FIG. 1.

As is shown in FIG. 4, the bolt 14 is received in the lower end 38 of the sleeve 12. Because at least a portion of the inner surface 36 of the sleeve 12 is defined by a hexagonal shape, and because a head 44 of the bolt 14 received in the portion 39 of the sleeve is also defined by a hexagonal shape, surfaces on the head 44 of the bolt 14 engage corresponding surfaces in the portion 39 of the sleeve, thereby preventing rotation of the bolt 14 within the sleeve 12, according to embodiments. Because the bolt 14 is prevented from rotation in the sleeve 12, a fastener 46, including but not limited to, nut 46 can be tightened down on the bolt 14 from the upper end 40 of the sleeve 12 during installation of the system 10. The nut 46 can be tightened only enough to pull the head 44 of the bolt 14 upward to fully compress the spring 18 and such that the head of the bolt 14 remains in the portion 39 of the sleeve 12 with the inner surface 36 defined by the hexagonal shape. The present invention is not limited to the use of hexagonal shapes on the head 44 of the bolt 14 and on the inner surface 36 of the sleeve 12, however, as other shapes are within the scope of the present invention. Other shapes that may be used include square, pentagonal, octagonal shapes, and the like. In the alternative, or in addition to the use of hexagonal or other shapes, a pin or the like can be inserted laterally through the sleeve 12 and the bolt 14 to prevent the bolt 14 from turning in the sleeve 12.

Axial movement of the bolt 14 within the sleeve 12 is controlled by the spring 18. The spring 18 as shown in the illustrated embodiment is a coil spring that is received into the lower end 38 of the sleeve 12 such that one end thereof is abutted against a shoulder 50 extending circumferentially around the inner surface 36 of the sleeve 12. When the bolt 14 is located through the spring 18 and made to extend through the plate 16, the bolt 14 is prevented from rotation in the sleeve 12 by the engagement of the hexagonally-shaped head 44 with the hexagonally-shaped portion 39 of the inner surface 36. The nut 46 can then be tightened, thereby pulling the bolt 14 in the direction indicated by arrow 52 and compressing the spring 18 against the shoulder 50 while simultaneously pulling the plate 16 in the direction indicated by arrow 54 against the concrete substrate 22 to secure the plate 16. A force is thereby applied to the system 10, thereby controlling and/or reducing movement of the plate 16 relative to the plane of attachment thereof to the concrete substrate 22.

Attachment of the plate 16 to the concrete substrate 22 using system 10 permits the plate 16 to move to some degree in the direction indicated by arrow 52 relative to the concrete substrate 22 (for example, due to frost heave) as long as the spring 18 can be further compressed. The concrete substrate 22 with the plate 16 can also move (to some degree) up, down, laterally, or in combinations thereof relative to an adjacent concrete substrate. One side of the plate 16 can also, through suitable clearances within the system 10 itself, lift away from the upper surface of the concrete substrate 22, for example, by movement of one side of the structure comprising the adjacent concrete substrate, thus causing the bolt 14 to deflect the spring 18 within the sleeve 12. When any of the foregoing movements occur, or when other forces cause movement resulting in the application of stress to the plate 16, the bolt 14 moves against the surrounding spring 18, thereby relieving the stress and preventing distortion of or damage to the plate 16 or concrete substrate 22 in the proximity of the hole in which the system 10 is anchored. Clearances between the bolt 14 and the spring 18, as well as the spring 18 and the sleeve 12 mitigate the stresses induced by the movement of the bolt 14. Such movement of the bolt 14 may occur as a result of temperature changes, seismic events, wind, rain, or weather-related phenomenon, as well as through loading from vehicles or other traffic passing, stopping, or accelerating from a stationary position over the system 10 or the plate 16.

Figure 5:
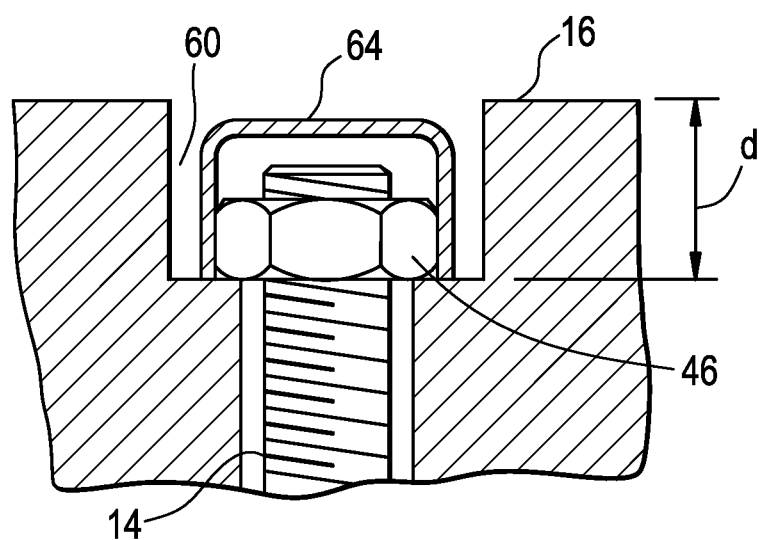
FIG. 5 is a side sectional view of a nut located in a channel of a cover plate of the system of FIG. 1.

As is shown in FIG. 5, the nut 46 is used to retain the plate 16 on the concrete substrate 22. The nut 46 may be a lock nut or the like. The bolt 14 is also configured and sized to be received through the plate 16 and in a channel 60 or other recess in the exposed face of the plate 16 such that upon tightening the nut 46 onto the bolt 14, the nut 46 or the portion of the bolt 14 extending through the nut 46 does not interfere with traffic on the plate 16 and further such that the nut 46 can be accessed (e.g., for removal or tightening) as desired. In particular, the nut 46 fits far enough into the channel 60 (and the bolt 14 does not protrude out of the channel) so as to not detrimentally affect rolling or foot traffic and to allow a suitable tool to engage the nut 46. As is shown, a height of the tightened nut 46 on the protruding bolt 14 is less than a depth d of the channel 60. A cap 64 or other device may be frictionally fit over the nut 46 to prevent sand, water, or debris from coming into direct contact with the nut 46.

It is noted that while bolt 14 and nut 46 primarily have been referred to above with reference to FIGS. 1-5, it will be understood that the above descriptions for bolt 14 also apply to afore-referenced post of which the bolt 14 is an example. Similarly, the above descriptions for nut 46 also apply to afore-referenced fastener of which the nut 46 is an example.

Figure 6:
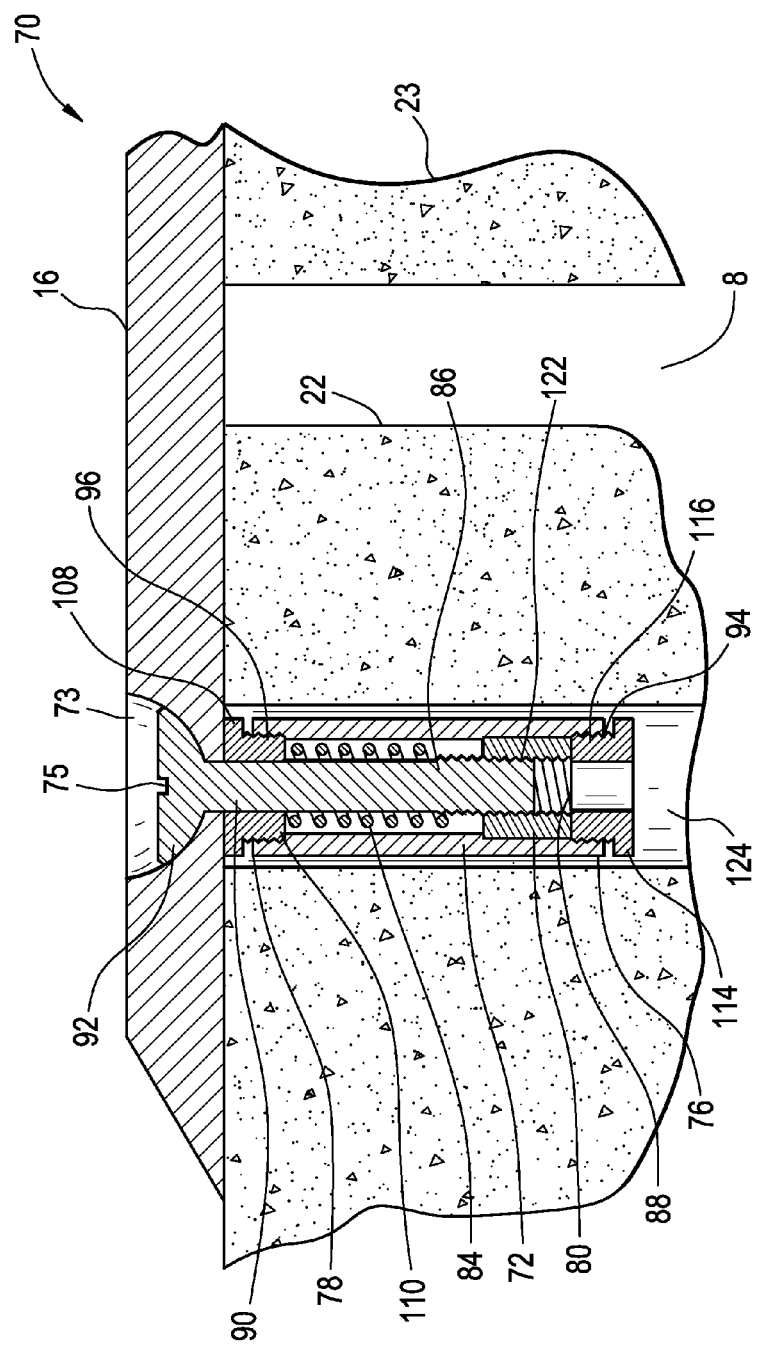
FIG. 6 is a side sectional view of another system configured to anchor plates over an expansion joint or gap, according to an embodiment.

Referring now to FIG. 6, illustrated therein a side sectional view of another system configured to anchor plates over an expansion joint or gap, according to embodiments. As is shown in FIG. 6, a system configured to anchor plates over an interface 8 (e.g., expansion joint, a joint, or a gap, and so forth) formed between two substantially coplanar substrates forming a structure and compensating for structural movement of the substrates is shown generally at 70 and is hereinafter referred to as "system 70." As in the case of system 10 described above, the two substantially coplanar substrates may be the floor of a parking garage or other structure. However, it is noted that the two coplanar substrates of FIG. 6 may define any structure. Furthermore, although the embodiment of FIG. 6 shows horizontal surfaces, other surfaces such as vertical surfaces and so forth are also applicable.

Figure 7:
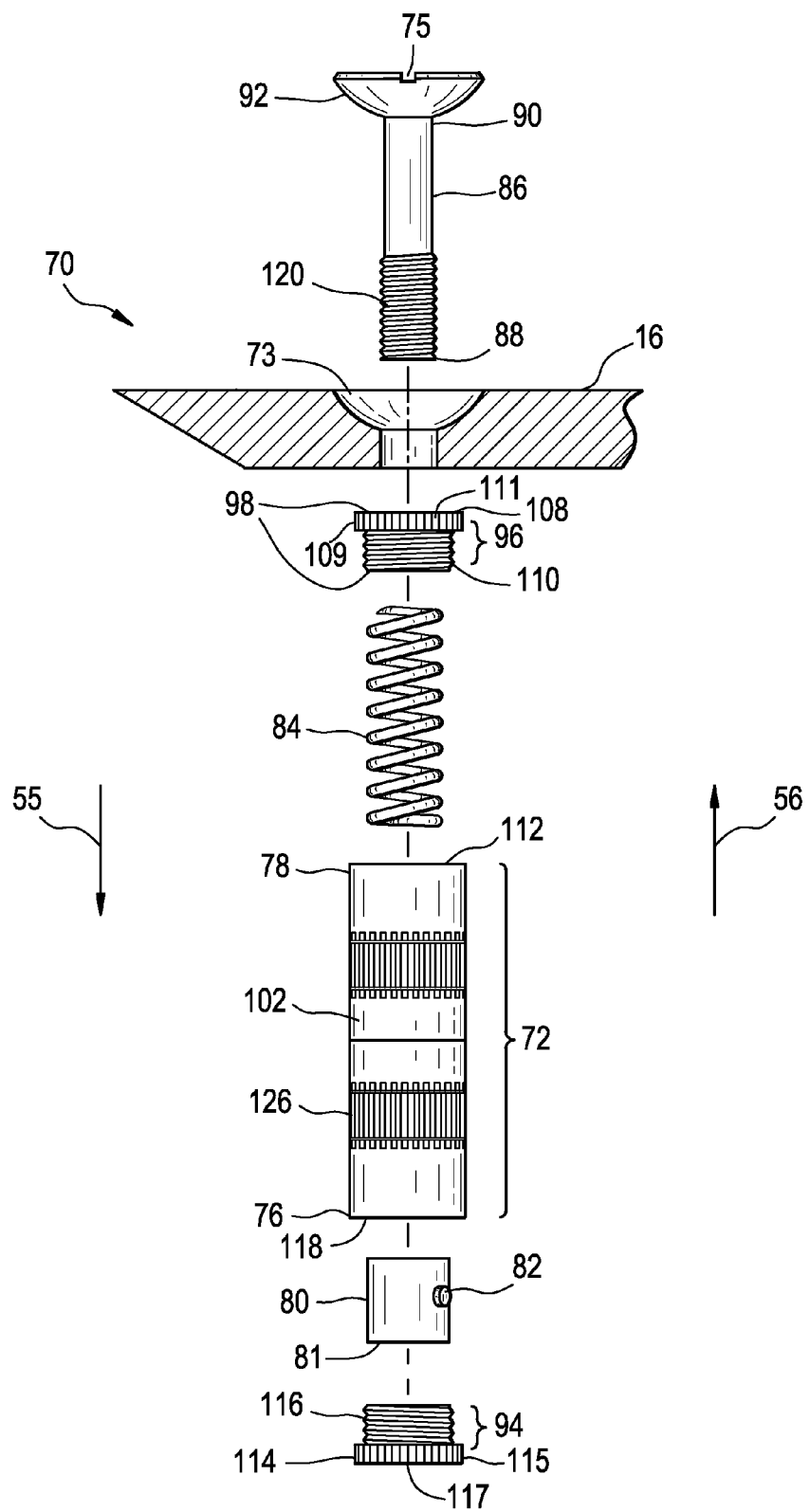
FIG. 7 is an exploded side sectional view of the system of FIG. 6.

Referring again to FIG. 6, the features of which are described in further detail below, system 70 is configured to anchor a cover plate 16 over interface 8 formed between first substrate 22 and second substrate 23, which are substantially coplanar with each other. System 70 comprises a sleeve 72 having a center channel 74 (best seen in FIG. 8) and anchorable in the first substrate 22. The sleeve 72 has a first end 76 and a second end 78, as shown in FIGS. 6 and 7. The system 70 further includes a collar 80 comprising a pin 82 such that the center channel 74 of the sleeve 72 receives the collar 80 at the pin 82, and a spring 84 is located in the sleeve 72 and positioned on the collar 80. A post 86 is located in communication with the spring 84, the post 86 configured to screw down into the collar 80 through the spring 84 to effect a tightening of the system 70. A lower end 88 of the post 86 is received in the sleeve 72 and an upper end 90 of the post 86 comprises a hemispherical head 92 extending out of the sleeve 72 and configured to be received in an opening in the cover plate 16. As further shown in FIGS. 6 and 7, the system 70 also includes a first end stop 94 configured to attach to the first end 76 of sleeve 72 and a second end stop 96 configured to attach to the second end 78 of the sleeve 72. The second end stop 96 comprises a center channel 98 which receives the post 86. Further details of these features are set forth below.

Regarding afore-referenced sleeve 72 of system 70, it is initially noted that the sleeve 72 is typically machined or swaged or otherwise manufactured as one part. The sleeve 72 is not limited to being manufactured as one part, however, as the sleeve 72 may comprise two or more parts that can be assembled to receive and encapsulate, e.g., the post 86, spring 84 and collar 80. When the sleeve 72 is constructed from multiple parts, the parts could be held together (thereby retaining, e.g., the collar 80, spring 84 and post 86) using bands, cable, or wire positioned or tightened around an outer surface 102 of the sleeve 72, a clip such as a spring clip, or any other suitable retaining mechanism.

The sleeve 72 may be anchored to the walls defining a hole in, for instance, a horizontally oriented surface of the structure, such as concrete substrate 22 shown in FIG. 6. The hole in the concrete substrate 22 in which the sleeve 72 is anchored may be drilled or otherwise formed as desired. For example, the hole may be drilled or otherwise formed subsequent to forming the concrete substrates 22, 23, prior to construction or as a result of a combination of such processing. Moreover, the use of the system 70 is not limited to structures employing concrete substrates 22, 23 as the substrates may be formed using other materials, as noted above. Thus, the formation of the hole or opening in the substrates can be tailored to suit the particular substrate material employed.

Referring to the exemplary, illustrated embodiment of FIG. 6, the sleeve 72 may be anchored to the walls of the hole in the concrete substrate 22 by any suitable anchoring mechanism, such as by a sealing mechanism using, e.g., an adhesive 24. As similarly explained above with respect to the embodiment of system 10 shown in FIG. 1, the adhesive 24 may be cementitious grout, elastomeric resin, epoxy, or any other material that facilitates the anchoring of the sleeve 72 into the concrete substrate 22, thereby locking the system 70 in place. The present invention is not limited to anchoring the sleeve 72 to the walls of the hole, however, as the sleeve 72 may also be configured such that an interference fit can be achieved by driving the sleeve 72 into the hole, thereby frictionally retaining the system 70 in the concrete substrate 22.

Figure 8:
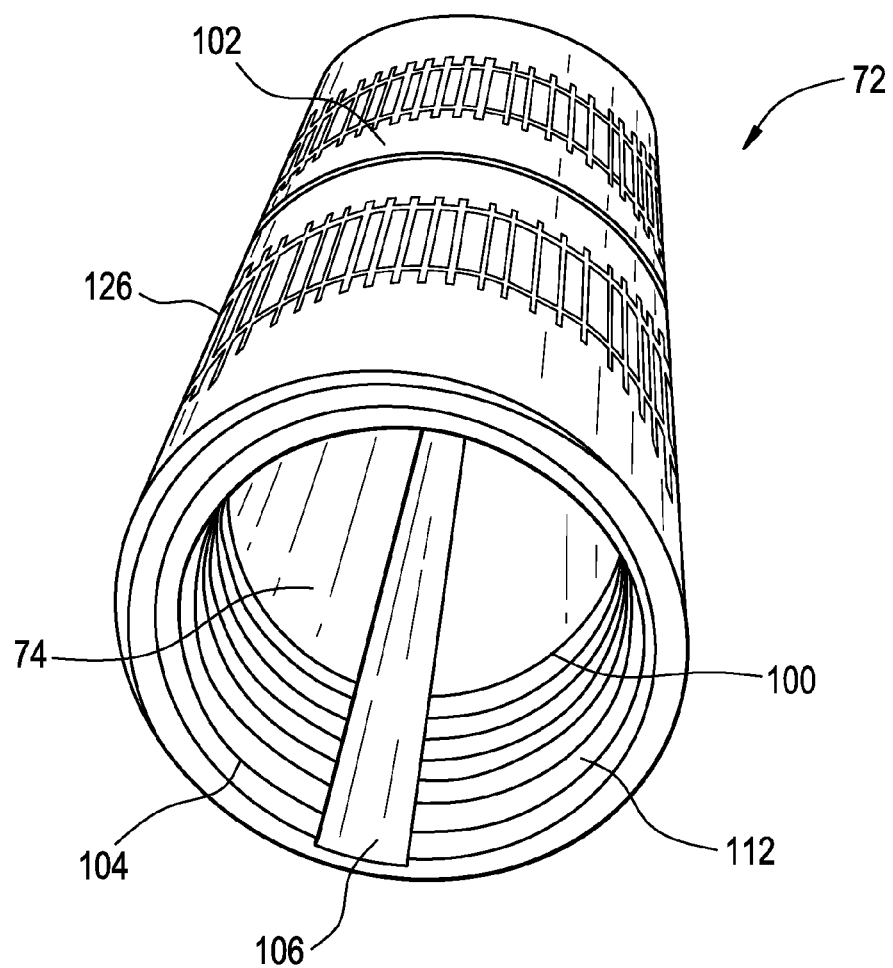
FIG. 8 is a perspective view of the sleeve used in the system of FIG. 6.

Irrespective of the configuration used, at least a portion of the outer surface 102 of the sleeve 72 may include ridges 126 that facilitate the anchoring of the sleeve 72 in the concrete substrate 22, as shown, for example, in FIGS. 7 and 8. FIGS. 7 and 8 show ridges 126 located on the outer surface 102 of the sleeve 72 and including a series of grooved lines extending around the outer circumference of the sleeve 72 in a band formation. However, other configurations/designs of ridges 126 also are possible.

As best seen in FIG. 8, the sleeve 72 is substantially cylindrical in shape and is defined by an inner surface 100, with a center channel 74, and an outer surface 102. The outer surface 102 of the sleeve 72 may be cylindrical as shown or any other desired shape (e.g., square) suited for being retained on the walls of the hole in the concrete substrate 22. The sleeve 72 has a first end 76 configured to be located within the concrete substrate 22 and a second end 78 configured to be located at the surface of the concrete substrate 22, as shown in FIG. 7.

As shown in FIG. 8, at least a portion of the inner surface 100 of the sleeve 72 is cylindrical in cross sectional geometry and comprises threads 104 on at least a portion of the inner surface 100. According to some non-limiting embodiments, the threads 104 are located on the inner surface 100 at each ends (first end 76 and second end 78) of the sleeve 72, with no threads located on the inner surface 100 therebetween. As further shown in FIG. 8, a groove 106 is located on the inner surface 100 of the sleeve 72. The groove 106 can extend along the entire length of the inner surface 100 from the first end 76 to the second end 78 of the sleeve 72. However, other configurations could be employed.

The groove 106 shown in FIG. 8 is configured to receive the pin 82 of the collar 80. Pin 82 is shown in FIG. 7 as a cylindrical protrusion. However, other shapes, such as square, rectangular and so forth could be employed. The shape and size of the groove 106 and pin 82 are determined such that they are complementary to each other. For example, the collar 80 should easily be able to fit within the center channel 74 of the sleeve 72 with the pin 82 sliding within groove 106 of the sleeve 72 upon insertion until coming to a stop within the sleeve 72.

The collar 80 is shown in the illustrated embodiment of FIG. 7 as being substantially cylindrical in cross section to fit within sleeve 72, and comprising a center channel 81. The center channel 81 of the collar 80 comprises inner threads 122 to receive a threaded portion 120 of the screw down post 86 during anchoring of the system 70, as described in further detail below.

As shown in FIGS. 6 and 7, post 86 is in communication with a spring 84 and is configured to screw down into the collar 80 through the spring 84 to effect a tightening of the system 70. Thus, the post 86 can be a screw down bolt, for example. In the illustrated embodiment, the post 86 comprises a lower end 88 comprising outer threads 120 to be received in the sleeve 72 and an upper end 92 comprising a hemispherical head 94. More particularly, at least a portion of the inner surface 100 of the sleeve 72 is defined by a cylindrical shape to receive the collar 80, as noted above. The outer threads 120 of the lower end 88 of the post 86 are configured to screw into the inner threads 122 of the collar 80 upon tightening, thereby preventing rotation of the post 86 within the sleeve 72. Thus, as shown, for example, in FIG. 6, the post 86 is received in the first end (lower end) 76 of the sleeve 72. At least a portion of the inner surface 100 of the sleeve 72 is defined by a cylindrical shape and an end of the post 86 received in the sleeve 72 via the collar 80 is also defined by a cylindrical shape. It is noted that while cylindrical shapes have been primarily referred to herein for, e.g., the sleeve 72, collar 80, post 86 and so forth, the present invention is not limited to the use of the afore-referenced cylindrical shapes. Other shapes such as square, pentagonal, hexagonal, octagonal and so forth could be employed provided, for example, that such components are complementary in shape to each other to effectively permit tightening of the system 70.

As shown in FIGS. 6 and 7, the hemispherical head 92 of the post 86 extends from the sleeve 72 and through a cover plate 16 which is positioned proximate the edge of concrete substrate 22 and across interface 8. Thus, post 86 with its hemispherical head 92 can be used to retain the plate 16 on the concrete substrate 22. The post 86 is configured and sized to be received through the plate 16 and in a channel 73 or other recess in the exposed face of the plate 16 such that upon tightening by screwing down the post 86, the hemispherical head 92 of the post 86 does not interfere with traffic on the plate 16 and further such that the hemispherical head 92 can be access (e.g., for removal, tightening and so forth) as desired. In particular, the hemispherical head 92 can fit far enough into the channel 73 such that the underside portion of the hemispherical head 92 can rest on a portion of the cover plate 16, as shown in FIG. 6. Thus, according to embodiments, the hemispherical head 92 does not protrude out of the channel 73 and does not detrimentally affect rolling or foot traffic. Moreover, this configuration can also allow for a suitable tool, such as a screw driver, to engage the post 86 at the hemispherical head 92. Accordingly, a slit 74 could be located on the hemispherical head 92 for such tool engagement, among other configurations. Additionally, if desired, as in the case of the embodiments described above with respect to system 10, a cap 64 or other device could be frictionally fit over the hemispherical head 92 to help protect the device by preventing contact with sand, water, debris and so forth.

With further regard to the afore-referenced hemispherical head 92, it is believed that this hemispherical shape can allow more ability to transfer force than other geometries thereby resulting in an more efficient and effective design particularly with respect to, for example, addressing pitch caused by seismic activity.

As further shown in FIGS. 6 and 7, system 70 further comprises a first end stop 94 configured to attach to the first end 76 of the sleeve 72 located in the substrate 22. First end stop 94 could cap or close the first end 76. According to embodiments, the first end stop 94 comprises a cylindrical extending lip portion 114 and a cylindrical portion 116 which is threaded on its outer surface and of a smaller diameter than the cylindrical extending lip portion 114. As shown in FIG. 7, edge 115 of the extending lip portion 114 can comprise ridges 117. The outer threaded cylindrical portion 116 of the first end stop 94 is configured to screw into the inner lower threaded portion 118 of the sleeve 72. It is noted that, according to embodiments, the first end stop 94 is of a solid construction and does not include an open center channel therein. Accordingly, upon securing the first end stop 94 to the sleeve 72, the collar 80 can rest upon on inner flat surface of the portion 116 and thus in this case the collar 80 would not extend all the way down to the first end 76 of the sleeve 72.

As also shown in FIGS. 6 and 7, the system 70 comprises a second end stop 96 configured to attach to the second end 78 of the sleeve 72 located near the surface of the substrate 22. According to embodiments, the second end step 96 comprises a cylindrical extending lip portion 108 and a lower, cylindrical portion 110 which is threaded on its outer surface and of a smaller diameter than the cylindrical extending lip portion 108. As shown in FIG. 7, edge 109 of the extending lip portion 108 can comprise ridges 111. The lower outer threaded cylindrical portion 110 of the second end stop 96 is configured to screw into the inner upper threaded portion 112 of the sleeve 72, as shown in FIG. 7, thereby attaching the second end stop 96 to the second end 78 of the sleeve 72. It is noted that, according to embodiments, unlike the solid construction of the first end stop 94, the second end stop 96 comprises a center channel 98 which receives the post 86 such that a portion of the cover plate 16 can be located between the hemispherical head 92 of the post 86 and the second end stop 96 upon tightening of the system 70. Accordingly, upon securing the second end stop 96 to the sleeve 72, with the post 86 located through a portion of the cover plate 16, as well as through the center channel 98 of the end stop 98 and through the spring 84, the hemispherical head 92 can rest on a portion of the cover plate 16, as shown in FIG. 6. It is noted that while cylindrical shapes have been primarily referred to above for the first end stop 94 and second end stop 96, the present invention is not limited to the use of the afore-referenced cylindrical shapes. Other shapes such as square, pentagonal, hexagonal, octagonal and so forth could be employed provided, for example, that such components are complementary in shape to each other to effectively permit tightening of the system 70.

Axial movement of the post 86 within the sleeve 72 is controlled, in part, by the spring 84. The spring 84 is shown in the illustrated embodiment of FIGS. 6 and 7 as a coil spring that is received in the first end (lower end) 76 of the sleeve 72 and positioned on the collar 80. When the post 86 is located through the spring 76 and made to extend through the plate 16, the post 86 is prevented from rotation in the sleeve 72 by the engagement of the outer threads 120 of the lower end 88 of the post 86 with the inner threads 122 of the collar 80. In an embodiment, the screw down post 86 can be tightened thereby pushing the post 86 down in the direction indicated by arrow 55 in FIG. 7 and compressing the spring 84 while simultaneously pulling the plate 16 against the concrete substrate 22 to secure the plate 16. A force is thereby applied to the system 70, thereby controlling and/or reducing movement of the plate 16 relative to the plane of attachment thereof to the concrete substrate 22.

Attachment of the plate 16 to the concrete substrate 22 using system 70 permits the plate 16 to move to some degree in the direction indicated by arrow 56 in FIG. 7 relative to the concrete substrate 22, for example, due to frost heave and so forth. The concrete substrate 22 with the plate 16 can also move to some degree up, down, laterally, or in combinations thereof relative to an adjacent concrete substrate. For example, tightening of the post 86 down into the sleeve 72 can secure the cover plate 16 in place over the gap 8 and allow the first substrate 22 and the second substrate 23 to move relative to each other in substantially coplanar directions. One side of the plate 16 can also, through suitable clearances within the system 70 itself, lift away from the upper surface of the concrete substrate 22, for example, by movement of one side of the structure comprising the adjacent concrete substrate, thus causing the post 86 to deflect the spring 84 within the sleeve 72. When any of the foregoing movements occur, or when other forces cause movement resulting in the application of stress to the plate 16, the post 86 moves against the surrounding spring 84 thereby assisting in relieving stress and preventing distortion of or damage to the plate 16 or concrete substrate 22 in the proximity of the hole in which the system 70 is anchored. Clearances between the post 86 and the spring 84, as well as the spring 84 and the sleeve 72 assist in mitigating stresses induced by any movement of the post 86. Such movement of the post 86 may occur as a result of temperature changes, seismic events, wind rain, or weather related phenomenon, as well as through loading from vehicles or other traffic passing, stopping, or accelerating from a stationary position over the system 70 or the plate 16.

In accordance with embodiments, an O-ring 20 or similar device, as described above with respect to system 10 could similarly be employed with system 70. For example, the O-ring or similar device could be located at the interface of the plate 16 and the surface of the concrete substrate 22 to limit and/or inhibit the passage of moisture and/or debris from the surface of the concrete substrate 22 and/or plate to, for example, the post 86 and spring 84.

Additionally, it is noted that the afore-described components of systems set forth above can be made of any suitable material. For example, metal such as steel, iron, titanium, and so forth could be used.

It is noted that the terms "a" and "an" and "the" herein do not denote a limitation of quantity, and are to be construed to cover both the singular and the plural, unless otherwise indicated herein or clearly contradicted by context. Any use of the suffix "(s)" herein is intended to include both the singular and the plural of the term that it modifies, thereby including one or more of that term. Reference throughout the specification to "one embodiment", "another embodiment", "an embodiment", and so forth, means that a particular element (e.g., feature, structure and/or characteristic) described in connection with the embodiment is included in at least one embodiment described herein, and may or may not be present in other embodiments. In addition, it is to be understood that the described elements may be combined in any suitable manner in the various embodiments. Moreover, regarding the Drawings, it is noted that the Drawings herein are merely representative of examples of embodiments and features thereof, and are thus not intended to be limiting or be of exact scale.

While the various embodiments including the movement-compensating plate anchor have been shown and described with respect to the detailed embodiments thereof, it will also be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A system configured to anchor a cover plate over an interface formed between a first substrate and a second substrate which are substantially coplanar with each other, the system comprising:
   a sleeve comprising a center channel and anchorable in the first substrate, wherein the sleeve has a first end and a second end;
   a collar comprising a pin, wherein the center channel of the sleeve receives the collar;
   a spring located in the sleeve and positioned on the collar;
   a post located in communication with the spring, the post configured to screw down into the collar through the spring to effect a tightening of the system, wherein a lower end of the post is received in the sleeve and an upper end of the post comprises a hemispherical head extending out of the sleeve and configured to be received in an opening in the cover plate;
   a first end stop configured to attach to the first end of sleeve; and
   a second end stop configured to attach to the second end of the sleeve, the second end stop comprising a center channel which receives the post.

2. The system of claim 1, wherein the sleeve has an inner surface and an outer surface, and at least a portion of the inner surface of the sleeve comprises threads.

3. The system of claim 2, wherein the inner surface of the sleeve comprises a groove in which the pin of the collar is received, the groove extending from the first end of the sleeve to the second end of the sleeve across the length of the sleeve.

4. The system of claim 2, wherein the second end stop comprises an extending lip portion and a lower outer threaded portion, the lower outer threaded portion of the second end stop configured to screw into an inner upper threaded portion of the sleeve.

5. The system of claim 4, wherein the first end stop comprises an extending lip portion and an outer threaded portion, the outer threaded portion of the first end stop configured to screw into an inner lower threaded portion of the sleeve.

6. The system of claim 2, wherein the post is a bolt comprising outer threads and is configured to screw down into inner threads of the collar to effect a tightening of the system.

7. The system of claim 1, further comprising a securing mechanism configured to anchor the sleeve to the first substrate.

8. The system of claim 7, wherein the securing mechanism comprises an adhesive.

9. The system of claim 7, wherein the sleeve comprises ridges configured to anchor the sleeve to the first substrate.

10. The system of claim 1, wherein the spring is configured to be compressed upon the tightening of the post down into the sleeve.

11. A covering system configured to cover a gap between a first substrate and a second substrate which are substantially coplanar with each other, the covering system comprising:
   a cover plate locatable over the gap defined between the first substrate and the second substrate substantially coplanar with the first substrate; and an anchoring system configured to anchor the cover plate over the gap, the anchoring system comprising:
   a sleeve comprising a center channel and anchorable in the first substrate, wherein the sleeve has a first end and a second end;
   a collar comprising a pin, wherein the center channel of the sleeve receives the collar;
   a spring located in the sleeve and positioned on the collar;
   a post located in communication with the spring, the post configured to screw down into the collar through the spring to effect a tightening of the anchoring system, wherein a lower end of the post is received in the sleeve and an upper end of the post comprises a hemispherical head extending out of the sleeve and configured to be received through an opening in the cover plate;
   a first end stop configured to attach to the first end of sleeve; and
   a second end stop configured to attach to the second end of the sleeve, the second end stop comprising a center channel which receives the post such that the hemispherical head of the post is configured to rest on a portion of the cover plate.

12. An anchor configured to anchor a cover plate over a gap formed between a first substrate and a second substrate which are substantially coplanar with each other, the anchor comprising:
- a sleeve comprising a center channel and anchorable in the first substrate, wherein the sleeve has a first end and a second end;
- a collar comprising a pin, wherein the center channel of the sleeve receives the collar;
- a spring located in the sleeve and positioned on the collar;
- a post located in communication with the spring, the post configured to screw down into the collar through the spring to effect a tightening of the anchoring system, wherein a lower end of the post is received in the sleeve and an upper end of the post comprises a hemispherical head extending out of the sleeve and configured to be received through an opening in the cover plate;
- a first end stop configured to attach to the first end of sleeve; and
- a second end stop configured to attach to the second end of the sleeve, the second end stop comprising a center channel which receives the post.

13. A method of anchoring a cover plate over a gap formed between a first substrate and a second substrate which are substantially coplanar with each other, the method comprising:
- locating the cover plate over the gap defined between the first substrate and the second substrate substantially coplanar with the first substrate;
- providing an anchoring system in the first substrate to anchor the cover plate over the gap, the anchoring system comprising:
  - a sleeve comprising a center channel, the sleeve being anchored in the first substrate, wherein the sleeve has a first end and a second end;
  - a collar comprising a pin, wherein the center channel of the sleeve receives the collar;
  - a spring located in the sleeve and positioned on the collar;
  - a post located in communication with the spring, wherein a lower end of the post is received in the sleeve and an upper end of the post comprises a hemispherical head extending out of the sleeve and received in an opening in the cover plate;
  - a first end stop attached to the first end of sleeve; and
  - a second end stop attached to the second end of the sleeve, the second end stop comprising a center channel which receives the post such that the hemispherical head of the post rests on a portion of the cover plate; and
- tightening the post to screw the post down into the collar through a portion of the cover plate and through the spring to effect a tightening of the anchoring system.

14. The method of claim 13, wherein the post comprises a bolt and the spring compresses upon the tightening of the bolt down into the sleeve.

15. The method of claim 14, wherein tightening of the post down into the sleeve secures the cover plate in place over the gap and allows the first substrate and the second substrate to move relative to each other in substantially coplanar directions.

16. The method of claim 14, wherein clearances between the spring, the post and the sleeve allow for movement of the first substrate and the second substrate in non-coplanar directions.

* * * * *